United States Patent
Lefaure

(10) Patent No.: US 7,415,334 B2
(45) Date of Patent: Aug. 19, 2008

(54) PROCESS AND DEVICE OF CORRECTION FOR DETERMINING THE LONGITUDINAL POSITION OF AN EMITTER MOUNTED ON A WHEEL OF A VEHICLE

(75) Inventor: Philippe Lefaure, Montbrun (FR)

(73) Assignee: Continental Automotive France, Toulouse (FR)

( * ) Notice: Subject to any disclaimer, the term of this patent is extended or adjusted under 35 U.S.C. 154(b) by 621 days.

(21) Appl. No.: 11/148,226

(22) Filed: Jun. 9, 2005

(65) Prior Publication Data
US 2006/0004500 A1  Jan. 5, 2006

(30) Foreign Application Priority Data
Jun. 10, 2004  (FR) ................................... 04 06253

(51) Int. Cl.
B60C 23/00 (2006.01)
G06F 15/00 (2006.01)

(52) U.S. Cl. .............................. 701/29; 701/1; 701/35; 702/150; 340/442

(58) Field of Classification Search ..................... 701/1, 701/2, 29, 32, 33, 35, 145, 148, 150; 340/445, 340/442, 686.1, 446, 449; 73/146.2, 146.8
See application file for complete search history.

(56) References Cited

U.S. PATENT DOCUMENTS 4,570,152 A * 2/1986 Melton et al. ............... 340/449

2003/0164758 A1  9/2003  King et al.

FOREIGN PATENT DOCUMENTS

FR  2 826 731  1/2003

* cited by examiner

Primary Examiner—Tan Q Nguyen
(74) Attorney, Agent, or Firm—Young & Thompson

(57) ABSTRACT

The invention relates to a process of correction for determining, by a central unit that is provided with a receiver and that equips a vehicle, the longitudinal position, either on the front wheel assembly or on the rear wheel assembly, of emitters that are each mounted on a wheel of said vehicle. This process consists of, in a preliminary phase, determining and storing, for each wheel of the vehicle, a reference field level, received by the receiver and having for an origin an emitter that is combined with said wheel and that exhibits a given mean radiated power. Then, during each start-up of the vehicle and according to the process of the invention, the field levels that are received by the receiver are analyzed, and the location of each of said emitters is deduced therefrom; the analyzed field levels are compared to the reference field levels that correspond to the same location; the deviation between the analyzed field levels and the corresponding reference field levels is derived from this comparison, and the value of each analyzed field level is corrected by a value that is equivalent to the computed deviation, such that said analyzed field level is brought to the same level as the corresponding reference field level.

5 Claims, 3 Drawing Sheets

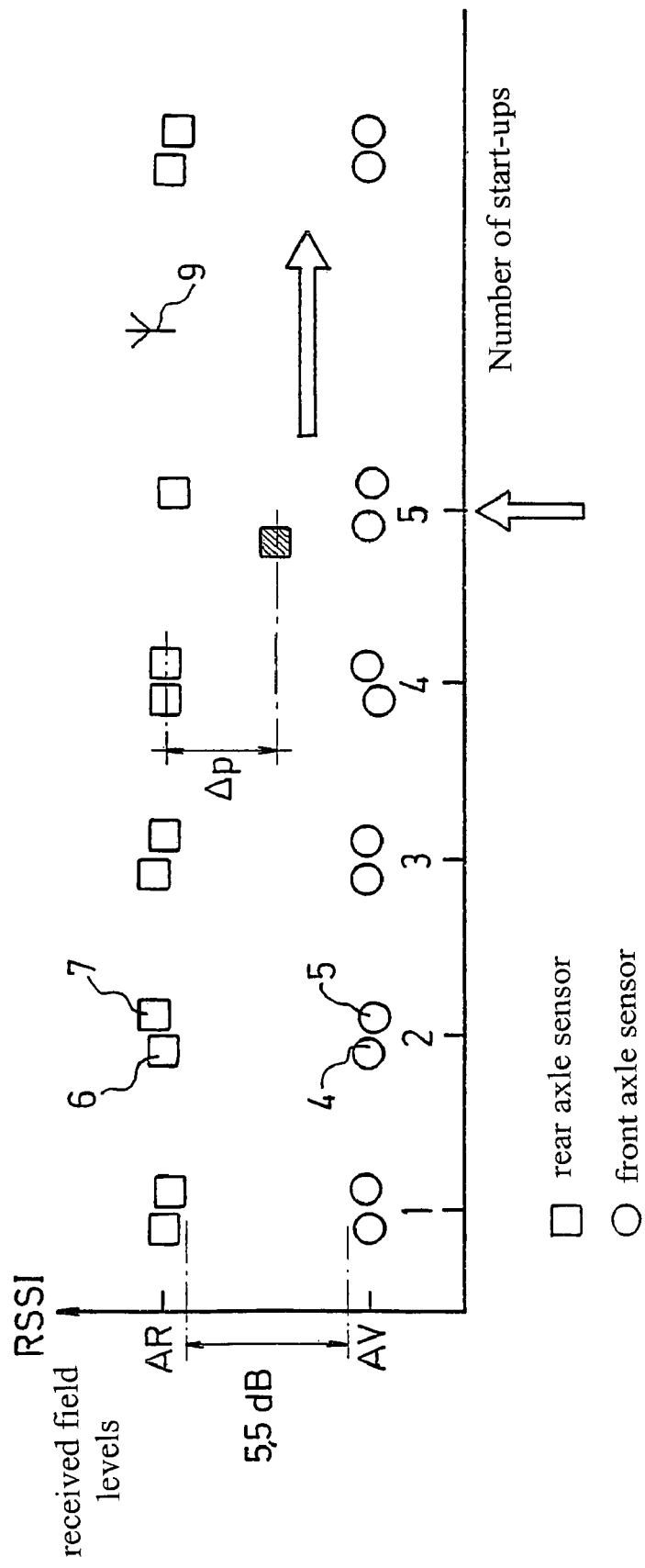

PROCESS AND DEVICE OF CORRECTION FOR DETERMINING THE LONGITUDINAL POSITION OF AN EMITTER MOUNTED ON A WHEEL OF A VEHICLE

FIELD OF THE INVENTION

The invention relates to a process and a device of correction for determining the longitudinal position, either on the front wheel assembly or on the rear wheel assembly, of an emitter that is mounted on a wheel of a vehicle.

BACKGROUND OF THE INVENTION

For safety purposes, an increasing number of motor vehicles have monitoring systems that comprise sensors that are mounted on each of the wheels of the vehicle, dedicated to the measurement of parameters, such as pressure and/or temperature of the tires that equip these wheels, and intended to inform the driver of any abnormal variation of the measured parameter.

These monitoring systems are conventionally endowed with a sensor that is mounted on each of the wheels of the vehicle and that comprises a microprocessor and a radiofrequency emitter (or RF emitter), and a central unit for receiving signals that are emitted by the emitters (whereby this central unit is placed in the vehicle), comprising a computer that integrates a radiofrequency receiver (or RF receiver) that is connected to an antenna and that has an RSSI-type output ("Receiver Signal Strength Indicator" or literally an indicator of the power of the signal of the receiver) that can allow the analysis of the field level received by said receiver.

The major problem that such monitoring systems are required to resolve resides in the obligation of having to combine with each signal received by the receiver information that provides the position, in particular the longitudinal position, with regard to the front wheel assembly or the rear wheel assembly, of the sensor at the origin of this signal, whereby this obligation will last throughout the service life of the vehicle, i.e., having to be respected even after wheels are changed or more simply the positions of these wheels are reversed.

At present, this longitudinal positioning of the front wheel assembly/rear wheel assembly is obtained by comparing the field levels received from each emitter by applying the known power attenuation principle of electromagnetic waves that obey a law of reduction that is proportional to the square of the distance between emitter and receiver.

According to this principle, it was noted that a reliable differentiation between front and rear wheel assemblies requires that a margin be set between the field levels received for the purpose of taking into account:

on the one hand, the power tolerance of the sensors that are used for the purpose of preventing possible power variations during a wheel change, on the other hand, the level difference required for a detectable differentiation between front wheel assembly and rear wheel assembly from a monitoring system standpoint.

In practice, and as shown in FIG. 2 (in which the antenna appears with reference 9), the required necessary margin proves to be on the order of 10 decibels: 4.5 dB for taking into account the tolerance of the sensors, and 5.5 dB for the front wheel assembly (AV)/rear wheel assembly (AR) differentiation.

Actually, such a margin proves necessary for eliminating, for example, during a wheel change, a reduction in the level difference between front wheel assembly and rear wheel assembly, resulting from the mounting on the new wheel of an end sensor from the power standpoint (i.e., a sensor whose power is close to one of the values, minimum or maximum, of its tolerance margin). By way of example, FIG. 3 illustrates the result that is obtained during the replacement of a left front wheel by a left front wheel combined with a sensor with a high power limit, which justifies the value of margin required.

In practice, however, ensuring such a margin turns out to constitute a limiting factor on the possibilities of use of the corresponding tire monitoring process, because this high margin is very difficult to ensure on all vehicle platforms and leads to significant constraints on the architecture of these vehicles.

SUMMARY OF THE INVENTION

The purpose of this invention is to remedy this drawback, and its main objective is to reduce the necessary above-mentioned margin to guarantee the differentiation of position between front wheel assembly and rear wheel assembly and consequently to reduce all the constraints that are associated with ensuring this margin.

To this end, the purpose of the invention is a process of correction for determining, by a central unit that is provided with a receiver and that equips a vehicle, the longitudinal position, either on the front wheel assembly or the rear wheel assembly, of emitters that are each mounted on a wheel of said vehicle, whereby said central unit can analyze the field levels received from each emitter and whereby said levels are inversely proportional to the distance between said emitters and the receiver.

According to the invention, this correction process is also characterized in that:

in a preliminary phase, a field level, so-called reference level, received by the receiver and having for an origin an emitter that is combined with said wheel and that exhibits a given mean radiated power, is determined and stored in the central unit for each wheel of the vehicle, and during each start-up of the vehicle:

the field levels that are received by the receiver and obtained from each of the emitters that are combined with wheels are analyzed, and the location of each of said emitters is deduced therefrom, the field level that is analyzed and that is obtained from each of the located emitters is compared to the reference field level that corresponds to the same location;

the deviation between the analyzed field level and the corresponding reference field level are derived from this comparison, and the value of each analyzed field level is corrected by a value that is equivalent to the computed deviation, such that said analyzed field level is brought to the same level as the corresponding reference field level.

The invention therefore consisted in using a preliminary phase that makes it possible to store the value of the mean field level received from each emitter by the receiver, then phases for monitoring during each of which the received field levels are compared to the stored values, and the results of these comparisons are used to correct possible relative power deviations that can appear during the service life of a vehicle, for example when wheels are changed, when wheel positions change, or even when pressure sensors age.

According to this principle, the invention thus makes it possible to reduce the necessary margin to ensure affront wheel assembly/rear wheel assembly differentiation, because it leads to elimination of the constraints that are linked to the emission power tolerances of the emitters that are mounted on the wheels.

According to an advantageous embodiment of the invention, a receiver that is equipped with an antenna that is positioned in the rear quarter of the vehicle is used.

Such a positioning of the antenna is considered preferable since it leads to using this antenna with regard to the least polluted portion of the vehicle from the standpoint of electronic disturbances.

Furthermore, according to another advantageous embodiment of the invention, the antenna is positioned such that the margin between the reference field levels corresponding to the front and rear wheel assemblies is approximately on the order of 5 to 6 decibels.

Such a margin actually proves to coincide with the level difference that is required for a correct differentiation between front wheel assembly and rear wheel assembly from a monitoring system standpoint.

The invention extends to a correction device for determining the longitudinal position, either on the front wheel assembly or on the rear wheel assembly, of emitters that are each mounted on a wheel of the vehicle, whereby said protective device comprises a central unit that is equipped with a receiver and is able to analyze the field levels that are received from each emitter, whereby said levels are inversely proportional to the distance between said emitters and said receiver.

According to the invention, this protective device is characterized in that:

the central unit comprises storage means, for each wheel of the vehicle, of a field level, so-called reference level, received by the receiver and having as an origin an emitter that is combined with said wheel and that exhibits a given mean radiated power, and whereby said central unit is programmed, during each start-up of the vehicle, for:

analyzing the field levels received by the receiver and obtained from each of the emitters that are combined with wheels, so as to derive therefrom the location of each of said emitters, comparing the analyzed field level that is obtained from each of the emitters that are located with the reference field level corresponding to the same location, deriving from this comparison the deviation between the analyzed field level and the corresponding reference field level, and correcting the value of each analyzed field level by a value that is equivalent to the computed deviation, such that said analyzed field level is brought to the same level as the corresponding reference field level.

BRIEF DESCRIPTION OF THE DRAWINGS

Other characteristics, objects and advantages of the invention will emerge from the detailed description that follows with reference to the accompanying drawings that represent a preferred embodiment thereof by way of non-limiting example. In these drawings:

FIG. 4 is a graph that shows series of field level values received from the four wheels of a vehicle by a receiver and that illustrates the correction process used according to the invention.

DETAILED DESCRIPTION OF THE INVENTION

Figure 1:
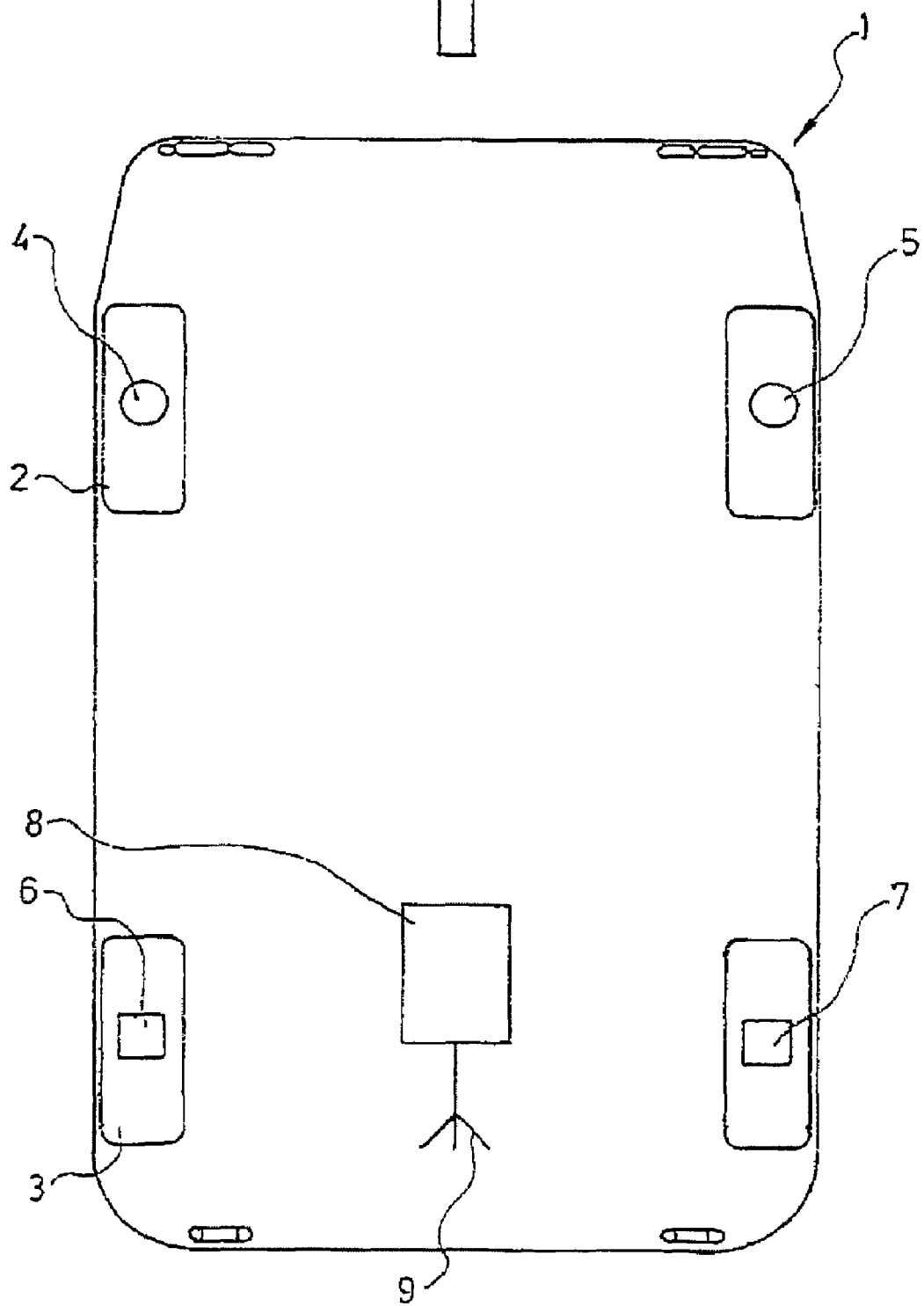
FIG. 1 is a schematic top view of a vehicle that is equipped with a monitoring system according to the invention, FIG. 2, as mentioned above, is a graph that illustrates mean field level values received from the four wheels of a vehicle by a receiver, FIG. 3, as mentioned above, is a graph that shows field level values that are received from the four wheels of a vehicle by a receiver, whereby one of said wheels is combined with an emitter with a high power limit.
Figure 2:
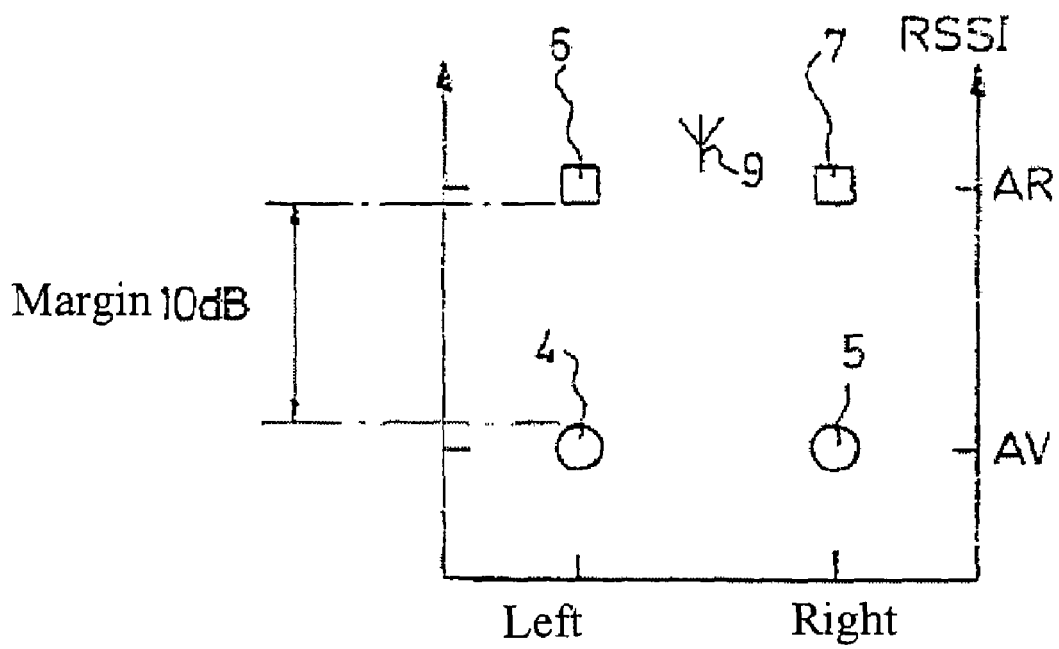
Figure 3:
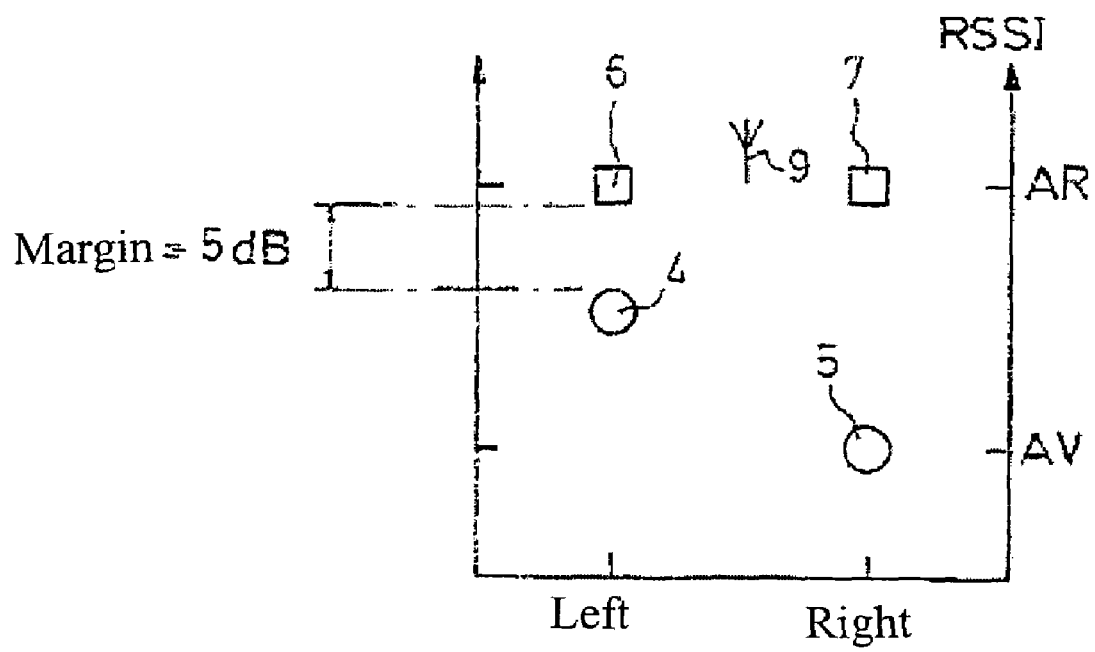

The monitoring system that uses the correction process according to the invention is shown, in FIG. 1, mounted on a vehicle 1 that is equipped with four wheels conventionally equipped with tires: two front wheels such as 2 at front wheel assembly (AV) and two rear wheels such as 3 at rear wheel assembly (AR).

This monitoring system primarily comprises, combined with each wheel 2, 3, a sensor, respectively 4, 5, 6, or 7, such as, for example, a pressure sensor that is attached to the wheel rim of said wheel 2, 3 so as to be positioned inside the cover of the tire.

These four sensors (4-7) are also identical, i.e., particularly adapted so that the power that is emitted by said sensors is identical to the defined tolerance margin.

Each of these sensors 4-7 consists of a microprocessor that integrates an identification code of said sensor and an RF emitter that can emit, for example, on a frequency of 433 MHz.

The monitoring system also comprises a centralized computer 8 that comprises a microprocessor and that integrates an RF receiver that can receive signals that are emitted by each of four sensors 4-7 and that is corrected, for this purpose, to an antenna 9 or is also integrated into the computer, either external and of the quarter-wave type.

The receiver also comprises an RSSI ("Receiver Signal Strength Indicator" or literally an indicator of the power of the signal of the receiver) that can make possible the analysis of the field level that is received by said receiver, whereby this analysis function is administered by the microprocessor of computer 8 by means of an analog/digital port for said RSSI output.

According to the example that is shown in FIG. 1, antenna 9 is also positioned longitudinally in the rear quarter of vehicle 1, close to the intersection between the median longitudinal axis of this vehicle 1 and the axis of the rear wheel assembly.

The correction process that is used according to the invention by means of the monitoring system that is described above primarily comprises a preliminary phase for determining, for each model of vehicle 1, reference values that are intended to be common to all the vehicles of this model and to be stored in computer 8 of said vehicles at the outputs of production lines.

This preliminary phase is carried out by equipping a standard vehicle of the model in question:

with a computer 8 whose position of antenna 9 is specifically defined so as to be able to be duplicated in all subsequent vehicles of the same model, four identical sensors 4-7 that are selected to have the same emission power corresponding to the mean power of the tolerance range of said sensors.

Once the standard vehicle is thus equipped, the preliminary phase consists in determining for each sensor 4-7, and therefore for each wheel 2, 3 of the vehicle, reference values that correspond, for each of said sensors, to the field level that is received by the receiver of computer 8.

Finally, as mentioned above, these reference values are recorded in computer 8 of each vehicle of the same model as the standard model.

Once this preliminary phase is carried out, and during the entire life of vehicles 1, the process according to the invention consists, during each start-up of these vehicles, in first carrying out a location of sensors 4-7 that are mounted on wheels 2, 3 by using, for example, as described in FR 2 826 731, the property of power attenuation of electromagnetic waves during the propagation of the latter and therefore by analyzing the field levels received by the receiver and obtained from each of said sensors.

The following stages then consist in comparing the field levels received, for each sensor 4-7, with the stored corresponding reference values, then, for each sensor 4-7, in deriving from this comparison the deviation between the received field level and the reference value, and, finally, in optionally correcting the received field level from a value that is equal to the measured deviation so as to align said received field level with the corresponding reference value.

According to this principle, the correction process according to the invention remains "transparent," i.e., does not produce any correction as long as no event occurs to modify the received field levels.

In contrast, this correction process becomes "active," i.e., to produce value corrections of the received field levels during the appearance, between two start-ups, of an event that consists of, for example:
- a change of at least one wheel 2, 3, identified by the detection of a new identification code of the sensor,
- a changing of the position of wheels 2, 3, identified by modifications of the received field levels that are not linked to new identification codes,
- an aging of a sensor that produces an attenuation of its emitted power.

By way of example, FIG. 4 shows the field levels analyzed during successive start-ups of a vehicle 1, which will produce:
- during the first four start-ups field levels that are similar to the reference values that are stored for front wheel assembly AV and rear wheel assembly AR, whereby said levels effectively cause no correction resulting from the use of the process according to the invention,
- during the fifth start-up, a change in the left rear wheel and its replacement by a wheel combined with a sensor with a low power limit (this is visible in FIG. 4 since the deviation, for this left rear wheel and the left front wheel, is very clearly reduced relative to the preceding four start-ups),
- the consequences of the use of the process according to the invention following this wheel change, which leads to correcting the received field level of the sensor of the new left rear wheel, of a value that is equal to deviation Δp between this received field level and the corresponding stored reference value.

This graph of FIG. 4 also shows that, because of the corrections it produces, the process according to the invention leads to removing constraints that are linked to tolerances in emission power of sensors 4-7 and also to reducing the margin necessary to ensure the differentiation of position between front wheel assembly and rear wheel assembly.

This margin actually turns out to equate to the level difference that is required for differentiating between the front wheel assembly and the rear wheel assembly from a monitoring system standpoint, in the example shown equal to 5.5 dB and therefore not taking into account deviations between sensors (4.5 dB).

As a variant, when the deviations between the received field levels at each start-up and the reference field levels are stable and permanent, the process according to the invention also makes it possible to modify original reference levels to take into account these persistent deviations noted. Thus, the reference field levels are revealed by filtering (not presented in detail because it is of known type) based on the observed (computed) deviations.

The invention claimed is:

1. Process of correction for determining, by a central unit (8) that is provided with a receiver and that equips a vehicle (1), the longitudinal position, either on front wheel assembly (AV) or on rear wheel assembly (AR), of emitters (4-7) that are each mounted on a wheel (2, 3) of said vehicle, whereby said central unit can analyze the field levels received from each emitter (4-7) and whereby said levels are inversely proportional to the distance between said emitters and the receiver, whereby said process is characterized in that:
   in a preliminary phase, a field level, so-called reference level, received by the receiver and having for an origin an emitter (4-7) that is combined with said wheel and that exhibits a given mean radiated power, is determined and stored in central unit (8) for each wheel (2, 3) of vehicle (1),
   and during each start-up of the vehicle:
      the field levels that are received by the receiver and obtained from each of the emitters that are combined with wheels (2, 3) are analyzed, and the location of each of said emitters is deduced therefrom,
      the field level that is analyzed and that is obtained from each of the located emitters is compared to the reference field level that corresponds to the same location;
      the deviation Δp between the analyzed field level and the corresponding reference field level are derived from this comparison,
      and the value of each analyzed field level is corrected by a value that is equivalent to the computed deviation, such that said analyzed field level is brought to the same level as the corresponding reference field level.

2. Process of correction according to claim 1, characterized in that a receiver that is equipped with an antenna (9) that is positioned in the rear quarter of vehicle (1) is used.

3. Process of correction according to claim 2, wherein antenna (9) is positioned such that the margin between the reference field levels that correspond to the front and rear wheel assemblies are approximately on the order of 5 to 6 decibels.

4. Process of correction according to any of the preceding claims, wherein the reference field levels are revealed by filtering based on the computed deviations.

5. Correction device for determining the longitudinal position, either on the front wheel assembly or on the rear wheel assembly, of emitters (4-7) that are each mounted on a wheel (2, 3) of a vehicle (1), whereby said correction device comprises a central unit (8) that is equipped with a receiver and is able to analyze the field levels that are received from each emitter (4-7), whereby said levels are inversely proportional to the distance between said emitters and said receiver, and is characterized in that:
   central unit (8) comprises storage means, for each wheel (2, 3) of vehicle (1), of a field level, so-called reference level, received by the receiver and having as an origin an emitter (4-7) that is combined with said wheel and that exhibits a given mean radiated power,
   and said central unit is programmed, during each start-up of vehicle (1), for:
      analyzing the field levels received by the receiver and obtained from each of the emitters that are combined with wheels (2, 3), so as to derive therefrom the location of each of said emitters, comparing the analyzed field level that is obtained from each of the located emitters with the reference field level corresponding to the same location, deriving from this comparison the deviation between the analyzed field level and the corresponding reference field level, and correcting the value of each analyzed field level by a value that is equivalent to the computed deviation, such that said analyzed field level is brought to the same level as the corresponding reference field level.

* * * * *